US012321255B2

(12) United States Patent
Noorizadeh et al.

(10) Patent No.: US 12,321,255 B2
(45) Date of Patent: Jun. 3, 2025

(54) TEST CASE SCENARIO REAL-TIME GENERATOR

(71) Applicant: Bank of America Corporation, Charlotte, NC (US)

(72) Inventors: Emad Noorizadeh, Plano, TX (US); Donatus Asumu, McKinney, TX (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 200 days.

(21) Appl. No.: 18/144,325

(22) Filed: May 8, 2023

(65) Prior Publication Data
US 2024/0378139 A1    Nov. 14, 2024

(51) Int. Cl.
| | |
|---|---|
| G06F 11/3668 | (2025.01) |
| G06F 8/10 | (2018.01) |
| G06F 9/54 | (2006.01) |
| G06F 11/3698 | (2025.01) |
| G06F 40/279 | (2020.01) |
| G06F 40/35 | (2020.01) |
| G06F 40/47 | (2020.01) |

(Continued)

(52) U.S. Cl.
CPC ............ *G06F 11/3684* (2013.01); *G06F 8/10* (2013.01); *G06F 9/541* (2013.01); *G06F 11/3668* (2013.01); *G06F 11/3698* (2025.01); *G06F 40/279* (2020.01); *G06F 40/35* (2020.01); *G06F 40/47* (2020.01); *G06F 16/3329* (2019.01); *G06N 3/082* (2013.01); *G06N 5/04* (2013.01); *G06Q 20/36* (2013.01); *H04L 67/75* (2022.05)

(58) Field of Classification Search
CPC .... G06F 8/10; G06F 16/3329; G06F 11/3684; G06F 11/3668; G06F 11/3698; G06F 40/47; G06F 40/279; G06F 9/541; G06Q 20/36; G06N 3/082; G06N 5/04; G06N 20/00; H04M 3/5175; G10L 15/28; H04L 67/75
See application file for complete search history.

(56) References Cited

U.S. PATENT DOCUMENTS 11,442,992 B1 * 9/2022 Moon ..................... G06N 20/00
11,960,514 B1 * 4/2024 Taylert ................ G06F 16/3329
(Continued)

OTHER PUBLICATIONS

Toksoz et al., CN 108604204, (translation), Sep. 28, 2018, 49 pgs <CN_108604204.pdf>.*

*Primary Examiner* — Tuan A Vu
(74) *Attorney, Agent, or Firm* — Weiss & Arons LLP

(57) ABSTRACT

Methods for generating test case scenarios in response to natural language requests may be provided. Methods may receive a natural language formatted request for a test case scenario. The natural language formatted request may include a plurality of parameters. The plurality of parameters may define a scope of the test case scenario. Methods may extract, utilizing natural language processing and artificial intelligence, the plurality of parameters from the request. Methods may query logging applications for log entries that are similar to the role of the test case scenario. Methods may construct, using artificial intelligence, operating on the log entries, a test case scenario in computer language. The test case scenario may correspond to the natural language formatted request. Methods may test the scope of the test case scenario by executing the test case scenario.

13 Claims, 4 Drawing Sheets

| | time | utterance | contextual | level | intent | session |
|---|---|---|---|---|---|---|
| 204 | 2023-02-23 T 15:52:55:074 | I would like to see all declined transactions from this account | see transactions | 5 | SI_SEARCH_TRANSACTION | 38xoutp98j_eo9eldue52g-ia0veg e0qU80q89kpVaj-hc09;90h34-01_ 2897t74yb_09q409jv |
| 206 | 2023-02-23 T 15:52:11:672 | venus fitness | show transactions from fitness | 4 | SI_SEARCH_TRANSACTION | 31z-9249vn8j0_93u4hh894719-18vjgri_18509nVo4309c-43oYcg934 034jkiogm |
| 208 | 2023-02-23 T 15:51:53:693 | abc fitness | show processing transactions from abc fitness | 3 | SI_SEARCH_TRANSACTION | vYo3948-93vi200Koe-wpov3_ovp oe4iop489_44ew0-i390nv3ldYev Ukoe872m |
| 210 | 2023-02-23 T 15:55:53:694 | grocery A | show transactions from grocery A from February 2023 | 2 | SI_SEARCH_TRANSACTION | 3Q93dkI4839_vME98ynve0-309mv 3e90vn-0emf3o92_v0w2kem-mie39 30440-vm40vlPfp498jml92849 |
| 212 | 2023-02-23 T 15:55:07:826 | $39.90 | see transaction of $39.90 refund | 3 | SI_SEARCH_TRANSACTION | 9t327 viy823-2u8nuvfd_9e3Ye32io_92-j20jne2f9b-28ucJj2oi3 |
| 214 | 2023-02-23 T 15:52:33:123 | online transfer | view transfer | 4 | PI_CONTACT_US_CALL_TOPIC_ | E9-Vv3pnvpf498vn-v9_9u4ew-2 94i -0vw imkp-oivn9048rvn- kjr0v- inre-iwo78bpw3284tvn |

(51) Int. Cl.
  *G06F 16/3329*   (2025.01)
  *G06N 3/082*    (2023.01)
  *G06N 5/04*     (2023.01)
  *G06Q 20/36*    (2012.01)
  *H04L 67/75*    (2022.01)

(56) References Cited

U.S. PATENT DOCUMENTS

2018/0367484 A1* 12/2018 Rodriguez .............. H04L 67/75
2022/0318860 A1* 10/2022 Dorch ..................... G10L 15/28
2024/0281677 A1*  8/2024 Mifflin .................... G06N 5/04

* cited by examiner

New Search ⏤102

```
  index= "ecomm_Natural language engine" "Response to Interactive Conversational Hub"
1 | rex "(?<timestamp>\[\d{2}/\d{2}T\d{2}:\d{2}:\d{3}\]) \" (?<session>.*?) (- -)\""
2 | rex "\"predictedIntentName\":\"(?<intent>.*?)\",\"childIntents"
3 | rex "correctedQuery\":\"(<contextual>.*?)\",\"message\":"
4 | rex "originalMessage\":\"(<utterance>.*?)\",\"normalizedmessage"
5 | rex "ContextualInformationDeepestLevel\":\{\"valueset\":\[\"(?<level>\d{1,2}\"\],"
6 | eval time=strftime(_time, "%Y-%m-%d T %H:%M:%S:%3N)
7 | stats count(session) by time, session, utterance, contextual, level, intent
8 | sort session, time
9 |
10 | table time, utterance, contextual, level, intent, session
11 | join type=inner session
12 |[ search index= "ecomm_natural language engine" "Contextual Prediction overriding
     Regular Prediction"
13 | rex "(?<timestamp>\[\d{2}/\d{2}T\d{2}:\d{3}\]) \" (?<session>.*?) (- -)\""
14 | eval time=strftime(_time, "%Y-%m-%d T %H:%M:%S:%3N)
15 | stats count (session) by time, session
16 | table session, time]
```

✓ 23,999 events (2/23/23 3:51:00.000 PM to 2/23/23 3:56:30.000 PM)    No Event Sampling ▽

FIG. 1

| Events | Patterns | Statistics(23) | Visualization | | | |
|---|---|---|---|---|---|---|
| 20 Per Page | Format | Preview ▽ | | | | < Prev [1] 2 Next > |

| | time ◆ | utterance ◆ | contextual ◆ | level ◆ | intent ◆ | session ◆ |
|---|---|---|---|---|---|---|
| 204 | 2023-02-23 T 15:52:55:074 | I would like to see all declined transactions from this account | see transactions | 5 | SI_SEARCH_TRANSACTION | 38xoutp98j_e09eldue52g-ia0veg e0qU80q89kpVaj-hc09j90h34-01_ 2897t74yb_09q409jv |
| 206 | 2023-02-23 T 15:52:11:672 | venus fitness | show transactions from fitness | 4 | SI_SEARCH_TRANSACTION | 31z-9249vn8j0_93u4hh894719- 18vjgri_18509nVo4309c-430Ycg934 034jkiogm |
| 208 | 2023-02-23 T 15:51:53:693 | abc fitness | show processing transactions from abc fitness | 3 | SI_SEARCH_TRANSACTION | vYo3948-93vi200Koe-wpov3_ovp oe4iop489_44ew0-i390nv3ldYev Ukoe872m |
| 210 | 2023-02-23 T 15:55:53:694 | grocery A | show transactions from grocery A from February 2023 | 2 | SI_SEARCH_TRANSACTION | 3Q93dkl4839_vME98ynve0-309mv 3e90vn-0emf3o92_v0w2kem-mie39 30440-vm40vIPfp498jml92849 |
| 212 | 2023-02-23 T 15:55:07:826 | $39.90 | see transaction of $ 39.90 refund | 3 | SI_SEARCH_TRANSACTION | 9t327 viv823-2u8nuvfd_9e3Ye32io_ 92-j20jne2f9b-28ucJj2oi3 |
| 214 | 2023-02-23 T 15:52:33:123 | online transfer | view transfer | 4 | PI_CONTACT_US_CALL_ TOPIC_ | E9-Vv3pnvpf498vn-v9_9u4ew-2 94i -0vw imkp-oivn9048rvn- kjr0v- inre- iwo78bpw3284tvn |

FIG. 2

TEST CASE SCENARIO REAL-TIME GENERATOR

FIELD OF TECHNOLOGY

Aspects of the disclosure relate to testing large computer environments.

BACKGROUND OF THE DISCLOSURE

In order to ensure that large computer environments are operating effectively and efficiently, computer protocols may include testing the computer environments. Typically, large computer environments may be tested using one or more test cases. The one or more test cases may mimic interactions with the computer environment. The operator administering the tests may use the results of the test cases to further tune the computer environments.

Conventionally, test cases were manually-created. These manually-created test cases were difficult, time-consuming and resource-consuming to create. Furthermore, the manually-created test cases may be error prone.

Therefore, it may be desirable to create a system that can automatically generate test case scenarios. It would be further desirable for the system to be able to utilize legacy log files stored at one or more software applications within the computer environment to generate the test case scenarios.

SUMMARY OF THE DISCLOSURE

Apparatus and methods for generating test case scenarios and/or constructs in response to natural language requests may be provided. Apparatus and methods may construct test case constructs based on natural language requests.

The apparatus may include a natural language artificial intelligence request hardware processor. The processor may receive a natural language formatted request for a test case construct, also referred to, in the alternative as a test case scenario. The processor may receive multiple natural language formatted requests for test case constructs.

The processor may extract a plurality of parameters from the natural language formatted request. The plurality of parameters may characterize the role or the scope of the test case construct. An example of a request may be a test case construct that identifies conversations between a human and an interactive voice response unit that were transferred to a human agent. Upon execution of such a test, a user may be able to analyze and identify patterns in such conversations in order to increase the number of conversations completed successfully with the interactive voice response unit.

The processor may query one or more logging applications. The one or more logging applications may be included in, or linked to, one or more software applications. The one or more software applications may be identified in the plurality of parameters. The query may retrieve one or more log entries, from the logging applications, that characterize one or more computer executions that include greater than a predetermined number of parameters that correspond to the plurality of parameters. The one or more log entries may include data relating to a plurality of application programming interface ("API") calls. The API calls may be sent to one or more databases.

The processor may construct, using artificial intelligence in combination with the one or more log entries, a test case construct in computer language. The test case construct may correspond to the natural language formatted request. The test case construct may be capable of communicating directly with one or more APIs. The test case construct may be capable of communicating with the APIs independent of manual intervention.

The processor may execute the test case construct. The processor may receive an output in response to the execution of the test case construct in computer language. The processor may translate the output from computer language to natural language. The processor may present the output in natural language on a graphical user interface ("GUI").

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative diagram in accordance with principles of the disclosure;

FIG. 2 shows another illustrative diagram in accordance with principles of the disclosure;

DETAILED DESCRIPTION OF THE DISCLOSURE

Figure 3:
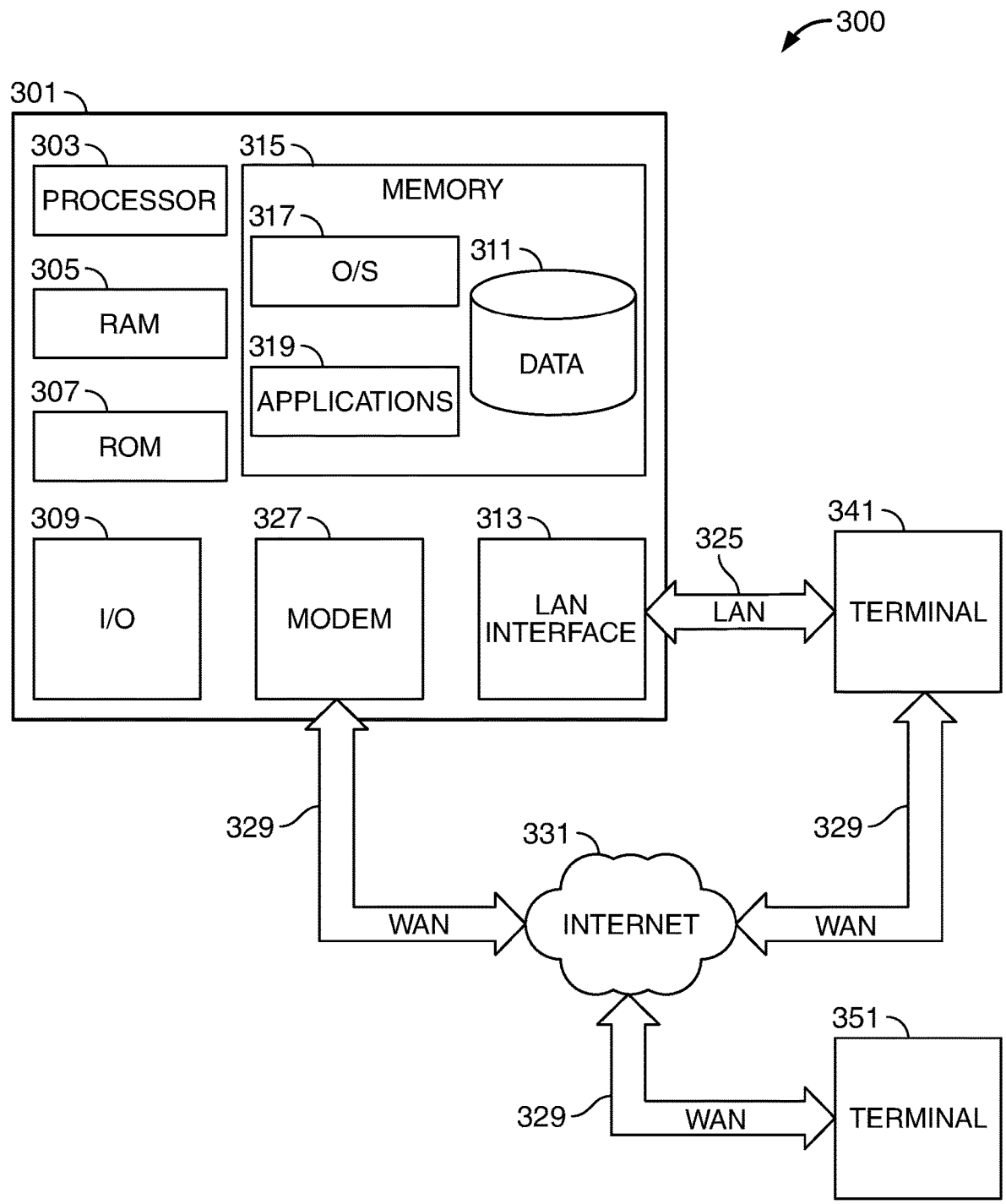
FIG. 3 shows still another illustrative diagram in accordance with principles of the disclosure.

Apparatus and methods for generating test case scenarios in response to natural language requests is provided. Methods may include receiving a natural language formatted request for a test case scenario. The natural language formatted request comprising a plurality of parameters. The plurality of parameters may characterize a role or a scope of the test case scenario.

Methods may include extracting, using natural language artificial intelligence, the plurality of parameters from the request. The natural language artificial intelligence may utilize ChatGPT® as an underlying source. ChatGPT® may be a conversational artificial intelligence model that interacts with a user in a conversational manner. Although, when using ChatGPT® for code generation for a specific domain, one may identify numerous gaps with the generated code, ChatGPT® may still be used as underlying source for the natural language artificial intelligence.

Methods may include querying one or more logging applications. Each software application within a computer network may include, or be linked to, a logging application. The logging application may create a log for each executable that the software application executes. As such, the logging application may be able to identify each process that the software application processed.

The query may peruse the logging applications for one or more log entries. The one or more log entries may characterize one or more computer executions that include greater than a predetermined number of parameters that correspond to the plurality of parameters that characterizing the role of the test case scenario. As such, the query may peruse the logging applications for log entries that are similar to the test case scenario to be created.

The log entries may include data relating to a plurality of application programming interface calls. The API calls may be sent to one or more databases.

Methods may include constructing a test case scenario in computer language. The construction may utilize artificial intelligence in combination with the one or more log entries. The test case scenario may correspond to the natural language formatted request. The test case scenario may communicate with APIs independent of manual intervention.

The test case scenario may include one or more regular expressions, relational database constructs and/or index searching constructs. Regular expressions may be a sequence of characters that specifies a search pattern. Relational database constructs may be search character strings that are designed to retrieve data from a relational database. Index searching constructs may be search character strings that are designed to search searchable content (also referred to as indexed content) within a database.

Methods may include implementing the test case scenario by executing the test case scenario and communicating with the APIs.

Methods may include receiving an output to the test case scenario in computer language. Methods may include translating to the output from computer language to natural language using natural language artificial intelligence. Methods may include presenting the output in natural language on a GUI.

At times, the test case scenario may test the success of contextual prediction as compared to non-contextual prediction. Contextual prediction may include considering all utterances included in a conversation to produce an output for a most recent utterance. Non-contextual prediction may include considering only a most-recent utterance in a conversation to produce an output.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows the sequence of a new search query, as shown at 102. The new search query may be generated in response to a natural language request for a test case scenario. The request and the new search query may be used to query one or more storage locations for specific data. Specifically, the new search query may retrieve a number of historical conversations in which contextual prediction overrode regular prediction. Contextual prediction may be using all utterances in a conversation to produce a response for a most-recent utterance. Regular prediction may be using only the most-recent utterance in a conversation to produce a response for a most-recent utterance. Each line included in the query may limit the scope of the query.

Line 1 of the query may include an index search. The index search parameters may be "ecomm_natural_language_engine" and "response to Interactive Conversational Hub ("ICH")". "Ecomm_natural_language_engine" may refer to electronic communications that occur within a natural language engine for a natural language processing engine. Response to ICH may refer to a machine learning system that may populate a processor which is to interact, engage, extract and process conversations. The ICH may represent what a caller intended to request.

Line 2 of the query may include a regular expression (also referred to as "rex"). A regular expression may be a sequence of characters that specifies a search pattern. The regular expression may limit the query by a specific timestamp and/or specific session identifier. As such, the regular expression may limit the scope of the query by instructing the query to retrieve data within a certain timeframe and/or from within a certain session.

Line 3 of the query may also include a regular expression. The regular expression may limit the query by a predicted intent name and/or a child intent name. The predicted intent name may be a name of an intent that system identified as the intent of the conversation. A child intent name may be a sub-intent to the predicted intent name. Intents of the conversation may include one or more reasons for the conversations. Examples of intents may include search for a transaction, dispute a charge and view account balances.

Line 4 of the query may also include a regular expression. The regular expression may limit the query to queries that have been corrected by a corrected contextual query. As such, line 4 may limit the query to queries that have used contextual prediction after a failed attempt at another prediction method, such as regular prediction.

Line 5 of the query may include a regular expression. The regular expression may limit the query to an original message the included the utterance and/or a normalized message.

Line 6 of the query may include a regular expression. The regular expression may limit the query to a specific depth of the contextual information used for intent prediction. The depth of the contextual information may be a metric that identifies a number of utterances used for contextual prediction. The depth of the contextual information used for intent prediction may be set to a specific value. The value set for the depth of the contextual information may be deepest, which may indicate utilization all of the utterances within a conversation for contextual prediction.

Line 7 of the query may include a parameter. A parameter may refer to a limit. The parameter may limit the evaluation time (eval time) of the query to a specific time frame.

Line 8 of the query may include a 'statistics count' instruction. The 'statistics count' instruction may count statistics of the session by one or more variables. The variables may include the following: time, session, utterance, contextual, level and intent.

Line 9 of the query may include a 'sort' instruction. The 'sort' instruction may sort the results of the query by a session variable and then by a time variable.

Line 10 of the query may include a 'table' instruction. The 'table' instruction may generate a table from the results of the query. The table may include a time, utterances, contextual, level, intent and session variables.

Line 11 of the query may include a 'join' instruction. The 'join' instruction may create a join within the table where joint type is equivalent to inner session.

Line 12 of the query may include a search index. The search index parameters may be "ecomm_natural_language_engine" and "Contextual Prediction overriding Regular Prediction". "Ecomm_natural_language_engine" may refer to electronic communications that occur within a natural language engine for a natural language processing engine. "Contextual Prediction overriding Regular Prediction" may refer to conversations in which contextual prediction is determined to be more effective in identifying an intent of a conversation than regular prediction.

Line 13 of the query may include a regular expression. The regular expression may limit the query by a specific timestamp and/or specific session identifier. As such, the regular expression may limit the scope of the query by instructing the query to retrieve data within a certain timeframe and/or from within a certain session.

Line 14 of the query may include a parameter. The parameter may limit the evaluation time (eval time) of the query to a specific time frame.

Line 15 of the query may include a 'statistics count' instruction. The 'statistics count' instruction may count statistics of the session by one or more variables. The variables may include the following: time and session.

Line 16 of the query may include a 'table' instruction. The 'table' instruction may generate a table from the results of the query. The table may include session and time variables.

At times, lines 1 through 11 may identify a first query and lines 12 through 16 may identify a second query.

FIG. 2 shows an illustrative diagram. The illustrative diagram shows a table that may be produced from a query, such as a query shown in FIG. 1. As such, the table may correspond to test results of the test case shown in FIG. 1.

Each of entries 204, 206, 208, 210, 212 and 214 may show a historical conversation between a caller and an interactive response unit that may be identified as relevant to the search query.

Entry 204 may include a timestamp and an utterance (I would like to see all declined transactions from this account). Entry 204 may also show a contextual prediction of the intent. The contextual prediction of the intent may be identified as see transactions. Entry 204 may also include a level (5), an intent (Service Intent (SI) Search Transaction) and a session identifier.

Entry 206 may include a timestamp and an utterance (venus fitness). Entry 206 may also show a contextual prediction of the intent. The contextual prediction of the intent may be identified as show transactions from fitness on fitness. The 'on fitness' term may indicate that the contextual prediction considers the entirety of the conversation between a human caller and an interactive voice response system. Entry 206 may also include a level (4), an intent (Service Intent (SI) Search Transaction) and a session identifier.

Entry 208 may include a timestamp and an utterance (abc fitness). Entry 208 may also show a contextual prediction of the intent. The contextual prediction of the intent may be identified as show processing transactions from abc fitness on processing. The 'on processing' term may indicate that the contextual prediction considers the entirety of the conversation between a human caller and an interactive voice response system. Entry 208 may also include a level (3), an intent (Service Intent (SI) Search Transaction) and a session identifier.

Entry 210 may include a timestamp and an utterance (grocery A). Entry 210 may also show a contextual prediction of the intent. The contextual prediction of the intent may be identified as show transactions from grocery A from February 2023. Entry 210 may also include a level (2), an intent (Service Intent (SI) Search Transaction) and a session identifier.

Entry 212 may include a timestamp and an utterance ($39.90). Entry 212 may also show a contextual prediction of the intent. The contextual prediction of the intent may be identified as see transaction of $39.90 refund. Entry 212 may also include a level (3), an intent (Service Intent (SI) Search Transaction) and a session identifier.

Entry 214 may include a timestamp and an utterance (online transfer). Entry 214 may also show a contextual prediction of the intent. The contextual prediction of the intent may be identified as view transfer. Entry 214 may also include a level (4), an intent (Professional Intent (PI) Contact Us call Topic) and a session identifier.

FIG. 3 shows an illustrative block diagram of system 300 that includes computer 301. Computer 301 may alternatively be referred to herein as a "server" or a "computing device." Computer 301 may be a workstation, desktop, laptop, tablet, smart phone, or any other suitable computing device. Elements of system 300, including computer 301, may be used to implement various aspects of the systems and methods disclosed herein.

Computer 301 may have a processor 303 for controlling the operation of the device and its associated components, and may include RAM 305, ROM 307, input/output module 309, and a memory 315. The processor 303 may also execute all software running on the computer—e.g., the operating system and/or voice recognition software. Other components commonly used for computers, such as EEPROM or Flash memory or any other suitable components, may also be part of the computer 301.

The memory 315 may comprise any suitable permanent storage technology—e.g., a hard drive. The memory 315 may store software including the operating system 317 and application(s) 319 along with any data 311 needed for the operation of the system 300. Memory 315 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 301 may execute the instructions embodied by the software to perform various functions.

Input/output ("I/O") module may include connectivity to a microphone, keyboard, touch screen, mouse, and/or stylus through which a user of computer 301 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 300 may be connected to other systems via a local area network (LAN) interface 313.

System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a local area network (LAN) 325 and a wide area network (WAN) 329, but may also include other networks. When used in a LAN networking environment, computer 301 is connected to LAN 325 through a LAN interface or adapter 313. When used in a WAN networking environment, computer 301 may include a modem 327 or other means for establishing communications over WAN 329, such as Internet 331.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking user functionality related to communication, such as e-mail, Short Message Service (SMS), and voice input and speech recognition applications. Application program(s) 319 (which may be alternatively referred to herein as "plugins," "applications," or "apps") may include computer executable instructions for invoking user functionality related to performing various tasks. The various tasks may be related to transaction pattern tracking and prediction.

Computer 301 and/or terminals 341 and 351 may also be devices including various other components, such as a battery, speaker, and/or antennas (not shown).

Terminal 351 and/or terminal 341 may be portable devices such as a laptop, cell phone, Blackberry™, tablet, smartphone, or any other suitable device for receiving, storing, transmitting and/or displaying relevant information. Terminals 351 and/or terminal 341 may be other devices. These devices may be identical to system 300 or different. The differences may be related to hardware components and/or software components.

Any information described above in connection with database 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
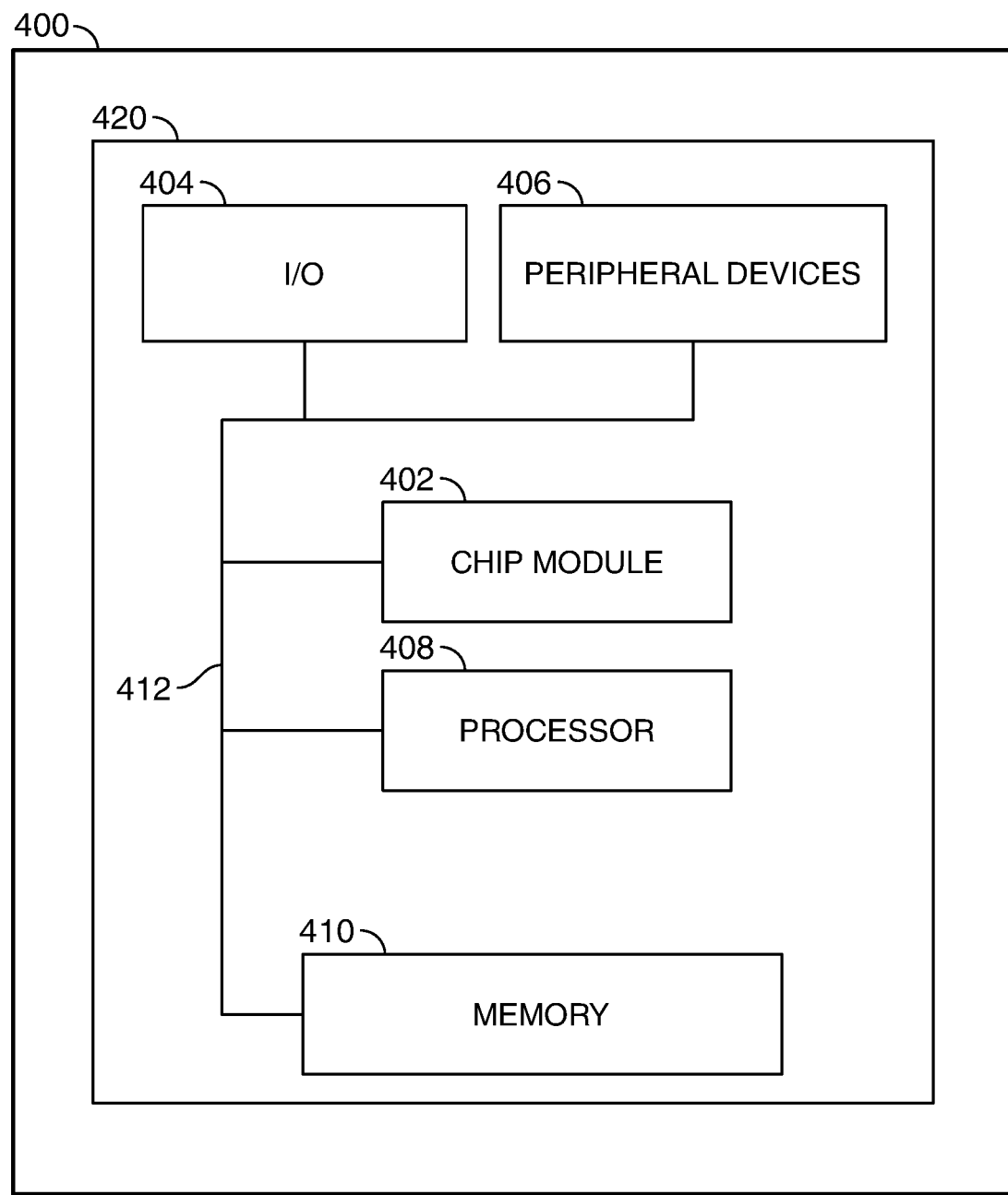
FIG. 4 shows yet another illustrative diagram in accordance with principles of the disclosure.

FIG. 4 shows illustrative apparatus 400 that may be configured in accordance with the principles of the disclosure. Apparatus 400 may be a computing machine. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions (which may be alternatively referred to herein as "computer instructions" or "computer code"), applications, signals, and/or any other suitable information or data structures.

Components 402, 404, 406, 408 and 410 may be coupled together by a system bus or other interconnections 412 and may be present on one or more circuit boards such as 420. In some embodiments, the components may be integrated into a single chip. The chip may be silicon-based.

Thus, systems and methods for generating test case scenarios in response to natural language requests are provided. Persons skilled in the art will appreciate that the present invention can be practiced by other than the described embodiments, which are presented for purposes of illustration rather than of limitation. The present invention is limited only by the claims that follow.

What is claimed is:

1. A method for generating test case scenarios in response to natural language requests, the method comprising:

receiving a natural language formatted request for a test case scenario, the natural language formatted request comprising a plurality of parameters, the plurality of parameters characterizing a role of the test case scenario;

extracting, utilizing natural language artificial intelligence, the plurality of parameters from the request;

querying one or more logging applications, included in one or more software applications, the one or more software applications identified in the plurality of parameters, for one or more log entries that characterize one or more computer executions that include greater than a predetermined number of parameters that correspond to the plurality of parameters characterizing the role of the test case scenario, the one or more log entries including data relating to a plurality of application programming interface ("API") calls, the plurality of API calls being sent to one or more databases;

constructing, using artificial intelligence in combination with the one or more log entries, a test case scenario to test the success of contextual prediction compared to non-contextual prediction, said test case scenario written in computer language, the test case scenario corresponding to the natural language formatted request, the test case scenario operable to communicate with application programming interfaces ("API") independent of manual intervention, the test case scenario operable to retrieve and display a plurality of historical conversations in which contextual prediction overrode regular prediction, said test case scenario comprising:
  a first regular expression, said first regular expression limiting the retrieved historical conversations to historical conversations that occurred within a specific timeframe and/or from within a specific session;
  a second regular expression, said second regular expression limiting the retrieved historical conversations to historical conversations that comprise a predicted intent name and/or a child intent name; and
  a third regular expression, said third regular expression limiting the retrieved historical conversations to historical conversations that have used contextual prediction upon a failed attempt at non-contextual prediction; and
implementing the test case scenario by executing the test case scenario and communicating with the APIs.

2. The method of claim 1 further comprising:
receiving an output to the test case scenario in computer language;
translating the output from computer language to natural language using natural language artificial intelligence; and
presenting the output in natural language on a graphical user interface ("GUI").

3. The method of claim 1 wherein the test case scenario comprises one or more regular expressions, relational database constructions and/or index searching constructs.

4. The method of claim 1 wherein the natural language artificial intelligence and the artificial intelligence uses ChatGPT® as an underlying source.

5. An apparatus for constructing test case constructs based on natural language requests, the apparatus comprising:
  a natural language artificial intelligence request hardware processor operable to:
    receive a natural language formatted request for test case construct;
    extract a plurality of parameters form the natural language formatted request, the plurality of parameters characterizing a role of the test case construct;
    query one or more logging applications, included in one or more software applications, the one or more software applications identified in the plurality of parameters, for one or more log entries that characterize one or more computer executions that include greater than a predetermined number of parameters that correspond to the plurality of parameters characterizing the role of the test case construct, the one or more log entries including data relating to a plurality of application programming interface ("API") calls, the API calls being sent to one or more databases;
    construct, using artificial intelligence in combination with the one or more log entries, a test case construct to test the success of contextual prediction compared to non-contextual prediction, said test case construct written in computer language, the test case construct corresponding to the natural language formatted request, the test case construct operable to communicate with application programming interfaces ("APIs"), the test case construct operable to retrieve and display a plurality of historical conversations in which contextual prediction overrode regular prediction, said test case scenario comprising:
      a first regular expression, said first regular expression limiting the retrieved historical conversations to historical conversations that occurred within a specific timeframe and/or from within a specific session;
      a second regular expression, said second regular expression limiting the retrieved historical conversations to historical conversations that comprise a predicted intent name and/or child intent name; and
      a third regular expressions, said third regular expression limiting the retrieved historical conversations to historical conversations that have used contextual prediction upon a failed attempt at non-contextual prediction; and
    execute the test case construct.

6. The apparatus of claim 5 wherein the test case construct is operable to communicate with the APIs independent of manual intervention.

7. The apparatus of claim 5 wherein the natural language artificial intelligence request hardware processor is further operable to:
  receive an output to the test case construct in computer language;
  translate the output from computer language to natural language; and
  present the output in natural language on a graphical user interface ("GUI").

8. The apparatus of claim 5 wherein the test case construct comprises one or more regular expressions, relational database constructs and/or index searching constructs.

9. The apparatus of claim 5 wherein the natural language artificial intelligence request hardware processor uses ChatGPT® as an underlying source.

10. A method for generating test case scenarios in response to natural language requests, the method comprising:
receiving a natural language formatted request for a test case scenario, the natural language formatted request comprising a plurality of parameters, the plurality of parameters defining a scope of the test case scenario;
extracting, utilizing natural language processing and artificial intelligence, the plurality of parameters from the request;
querying, one or more logging applications, included in one or more software applications, the one or more software applications identified in the plurality of parameters, for one or more log entries that characterize one or more computer executions that include greater than a predetermined number of parameters that correspond to the plurality of parameters characterizing the role of the test case scenario;
constructing, using artificial intelligence operating on the one or more log entries, a test case scenario to test the success of contextual prediction compared to non-contextual prediction, said test case scenario written in computer language, the test case scenario corresponding to the natural language formatted request, the test case scenario operable to retrieve and display a plurality of historical conversations in which contextual prediction overrode regular prediction, said test case scenario comprising:
  a first regular expression, said first regular expression limiting the retrieved historical conversations to historical conversations that occurred within a specific timeframe and/or from within a specific session;

a second regular expression, said second regular expression limiting the retrieved historical conversations to historical conversations that comprise a predicted intent name and/or child intent name; and a third regular expression, said third regular expressions limiting the retrieved historical conversations to historical conversations that have used contextual prediction upon a failed attempt at non-contextual prediction; and testing the scope of the test case scenario by executing the test case scenario.

11. The method of claim 10 wherein the contextual prediction considers all utterances in a conversation to produce an output for a most-recent utterance and non-contextual prediction considers only a most-recent utterance in a conversation to produce an output.

12. The method of claim 10 wherein the one or more log entries comprise a plurality of application programming interface ("API") calls between the software applications and one or more APIs.

13. The method of claim 12, wherein:

the constructed test case scenario includes one or more API calls, the one or more API calls correspond to the plurality of API calls between the software applications and the one or more APIs; and the constructed test case scenario is structured to communicate with the one or more APIs independent of manual intervention.

* * * * *